Figure 1:
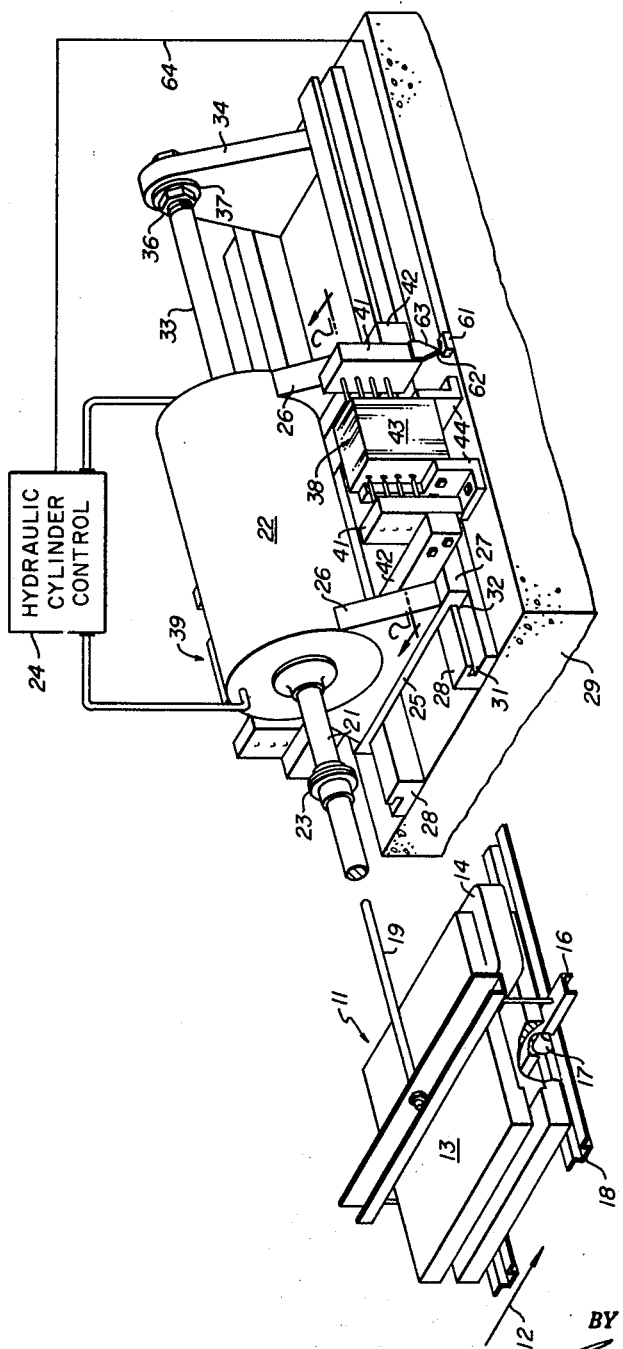

May 4, 1965  J. A. ROSKELLEY  3,181,653
CRASH ENERGY ABSORBER FOR HEAVY APPARATUS
Filed April 29, 1963  2 Sheets-Sheet 1

INVENTOR.
JACK A. ROSKELLEY
BY
ATTORNEY.

May 4, 1965 J. A. ROSKELLEY 3,181,653
CRASH ENERGY ABSORBER FOR HEAVY APPARATUS
Filed April 29, 1963 2 Sheets-Sheet 2

INVENTOR.
JACK A. ROSKELLEY
BY
ATTORNEY.

2

United States Patent Office 3,181,653
Patented May 4, 1965

3,181,653
CRASH ENERGY ABSORBER FOR HEAVY
APPARATUS
Jack A. Roskelley, Concord, Calif., assignor to the United States of America as represented by the United States Atomic Energy Commission
Filed Apr. 29, 1963, Ser. No. 276,677
7 Claims. (Cl. 188—1)

The present invention relates to safety devices for stopping heavy apparatus in the event of unwanted movement thereof and more particularly to a compact reliable means for absorbing the kinetic energy of such apparatus without rebound.

The invention was originally developed for the protection of a synchrocyclotron from damage due to structural failure in a plunging magnet system used for ion beam extraction. This magnet, weighing several tons, is plunged into the region of the accelerator beam when the particles therein have reached the desired energy. The field introduced by the magnet is transverse to the beam which is thereby deflected away from the internal accelerator orbit for bombardment of an external target. In the embodiment herein described, the magnet must be moved a distance of twenty eight inches and is then brought to a complete stop in about three fourths of a second. After being in this position for a period of one and one half seconds, the magnet is returned to the original position in another interval of three fourths of a second. The magnet then rests in the retracted position for one and one half seconds. This cycle is then repeated to extract successive beam pulses.

In view of the amount of energy involved in this magnet plunging operation it is very evident that an accidental breakage of any of the magnet anchoring parts would result in extensive damage to the accelerator and possible serious injury to personnel. For this reason it is very desirable to provide a means to stop any uncontrolled motion which may result from the breaking of anchor elements of the plunging magnet.

In addition to the need for compactness and reliability, it is necessary that the stopping means be non-resilient to avoid potentially dangerous rebound motion. Thus the stopping cannot be satisfactorily accomplished by the placement of a simple obstruction in the path of unwanted movement.

Although the present invention was designed to meet the foregoing requirements in conjunction with the described accelerator, the invention will be found to be equally applicable to other installations where the possible movement of heavy objects constitute a hazard. Briefly, the invention comprises one or more long pointed parallel spikes mounted on the element to be stopped and projecting therefrom in the direction of the undesired travel. A stationary, securely anchored pad is disposed adjacent the forward end of the spikes in position to be penetrated thereby in event of movement of the element. To provide for a gradual non-resilient absorption of the kinetic energy of the moving element, the pad is comprised of a series of parallel spaced apart plates of a strong ductile material such as sheet iron, the plates being disposed traversely in the path of the spikes.

Should the unit of equipment break loose from its anchors and tend to move toward the pad, the spikes will puncture the plates and bring the equipment to a quick stop. For example, by using four sharply pointed spikes of three fourths inch diameter and a pad having thirteen sheets of number 10 gauge sheets iron spaced three eighths of an inch apart it is possible to bring a four ton magnet to a complete stop, in less than five inches of travel, from a velocity of about ten feet per second.

If desired, a second unit of pointed spikes may be situated on the opposite side of the pad and connected to the equipment to protect it from movement in two opposite directions which correspond, for example, to the directions of plunging and retracting the above described accelerator beam deflector magnet.

Accordingly, it is an object of this invention to provide a compact and reliable means for stopping undesirable movement of heavy apparatus.

It is an object of the present invention to provide means for absorbing the kinetic energy of heavy apparatus in motion.

It is an object of this invention to provide a standby device for engaging and restraining a heavy object which is moving in an uncontrolled manner.

It is a further object of this invention to prevent damage which might be caused by heavy equipment in motion as a result of loss of control thereof.

It is still a further object of this invention to provide means for preventing an unwanted movement of a piece of heavy equipment, which means requires substantially no maintenance.

A further object of this invention is to provide for the absorption of the kinetic energy of very heavy moving objects without causing rebound thereof.

Another object of the present invention is the absorption of energy by the non-resilient deformation of material.

It is a further object of this invention to absorb the kinetic energy of emergency stops of heavy apparatus in motion by means which effects a controlled deceleration of the apparatus within a short length of travel.

It is another object of the present invention to provide means for protecting charged particle accelerators from damage by a heavy plunging beam deflector magnet in the event that the anchorage of the plunging magnet fails.

Figure 2:
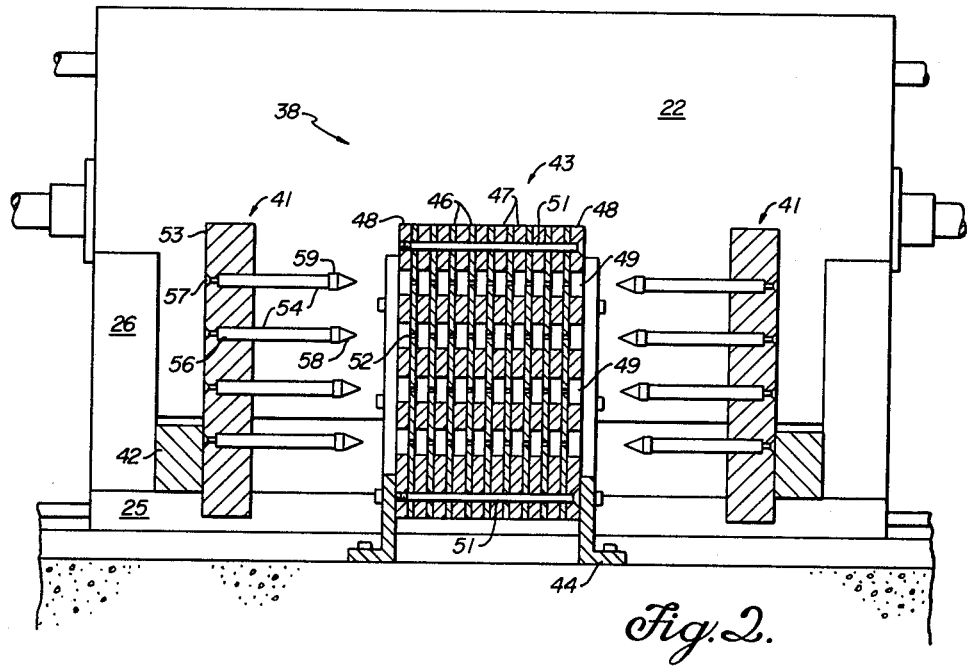
Figure 3:
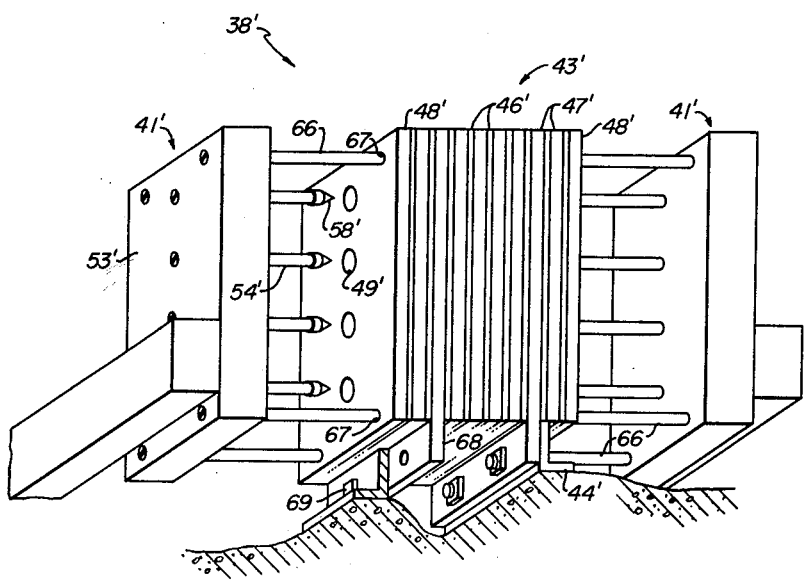

Other objects and advantages of this invention will be apparent to those skilled in the art upon consideration of the following specification and the accompanying drawings, of which:

FIGURE 1 is a perspective view of a plunging magnet assembly for deflecting a charged particle beam in an accelerator and showing a first embodiment of the invention mounted thereon, FIGURE 2 is a cross-sectional view taken along line 2—2 of FIGURE 1 and showing internal details of the energy absorption device of this invention, and FIGURE 3 is a perspective view of a second embodiment of the energy absorption device of this invention.

Referring now to the drawings and particularly to FIGURE 1 thereof, there is shown an electro-magnet 11 which is periodically plunged to a position adjacent the high energy charged particle beam orbit 12 of an accelerator for the purpose of deflecting the beam from the orbit. The detailed structure of magnet 11, as well as that of the accelerator, need not be considered for an understanding of the present invention and accordingly such structure will not be herein described, except for certain salient features of the magnet which are significant to the operation of the present invention.

Magnet 11 has a "C" type core 13 with an electrical coil 14 disposed thereon, and is mounted in a frame 16 equipped with supporting rollers 17. Rollers 17 move in the two parallel horizontal tracks 18 which are aligned in the direction that the magnet is to be reciprocated. Typically, magnet 11 may weigh approximately four tons and may be required to plunge twenty eight inches in three fourths of a second.

Considering now the magnet drive system, a rod 19 connects the magnet frame 16 to the piston rod 21 of a hydraulic cylinder 22 by means of a coupling 23. Hydraulic cylinder 22 is aligned along an axis, defined by the rods 19 and 21, which extends between tracks 18 in parallel relationship therewith, the cylinder being of conventional construction and having suitable conventional controls here indicated by control unit 24 for selectively reciprocating magnet 11 along the tracks. Cylinder 22 is mounted on a flat rectangular platform 25 by means of a pair of upwardly extending supports 26, one support being at each end of the cylinder. The underside of platform 25 is provided with runners 27 which engage two tracks 28 secured on the stationary base structure 29 beneath the cylinder 22, the tracks 28 being parallel to the axis of the cylinder. Each track 28 is preferably provided with a lateral groove 31 which is engaged by a horizontal tongue 32 on the adjacent runner 27 of platform 25 so that the platform may slide therealong and cannot be raised vertically therefrom.

Attached to the end of the cylinder 22 which is remote from piston rod 21 and extending therefrom in an axial direction is an anchor rod 33 which passes through a stationary anchor block 34 which in turn is secured to the base 29. Anchor rod 33 may conveniently be threaded over a large portion of its length with nuts 36 and washers 37 being engaged thereon, to secure the rod to the anchor block 34. By means of the anchor rod 33 and the nuts 36 the position of the hydraulic cylinder 22 may be adjusted along the tracks 28 until a desired location is reached such that magnet 11 is plunged to the proper position.

The anchor block 34 and anchor rod 33 thus function to hold the magnet 11 and its drive system in position and are subject to considerable strain in view of the rapid acceleration and deceleration of the heavy magnet. Inasmuch as the apparatus is employed within a very costly charged particle accelerator, breakage of the anchor elements would result in serious damage, particularly in view of the extremely high momentum of the massive magnet 11. Accordingly a pair of crash energy absorbers 38 and 39 are disposed one on each side of cylinder 22, to prevent any appreciable uncontrolled movement of the magnet 11 and drive cylinder 22 which might result from failure of the anchor rod 33, block 34 or adjacent elements.

Considering now the detailed structure of the absorber assembly 38, to which the second assembly 39 is similar, the two principal components thereof are a pair of piercing rod assemblies 41 secured to opposite ones of the cylinder mounting brackets 26 by means of brackets 42, one being on each side of a stationary crash pad assembly 43 which is secured to the base platform 29 by means of two brackets 44.

Referring now to FIGURE 2 in conjunction with FIGURE 1, the crash pad assembly 43 comprises a plurality of parallel plates 46 which in this embodiment are ten gauge sheet steel and of rectangular shape. Plates 46 are spaced apart by spacer blocks 47 and two end blocks 48 all of which are three eighths inch thick, in this example, and of the same rectangular shape and size as plates 46. The spacing blocks 47 and end blocks 48 are each provided with four matching holes 49 each one and one fourth inches in diameter and with the holes being located along a vertical band. With the spacing blocks 47, end blocks 48 and the plates 46 stacked together, corresponding holes 49 of each member are aligned. The four sets of holes 49 thus effectively form four parallel bores through the crash pad assembly 43, each such bore being blocked at intervals by the transverse plates 46. Bolts 51 passing through all the plates 46, spacing blocks 47 and end blocks 48 secure all the elements of crash pad 43 together as a unit.

In each plate 46 small holes 52, having a diameter equal to the thickness of the plate, are provided at the points where the axes of holes 49 in the spacer plates 47 and end plates 48 intersect plates 46. These holes 52 are desirable for developing a uniform decelerating force as will be more fully described later.

Each piercing rod assembly 41 has a spike support plate 53 secured in an upright position to a leg of a cylinder mounting bracket 26 and to base plate 25 by means of a transverse arm 42. Four parallel piercing rods or spikes 54 are mounted on each support plate 53 and project towards the crash pad 43, each rod 54 of each support plate being aligned with a separate one of the columns of holes 49 in the pad. The piercing rods 54 are sharply pointed at the projecting ends with the blunt ends being mounted in sockets 56 in the surfaces of the support plates 53. Screws 57 entering through the opposite sides of plates 53 into the bottom of each socket 56 are threaded into the ends of the rods 54 to secure the rods in place.

In the embodiment described herein the main body of each piercing rod 54 is five-eighths inch in diameter and eight inches long. The points 58 on the rods 54 are right angled cones in shape and are one and one half inches long, the base of the cone being three fourths inch in diameter or one eight inch more in diameter than the main body of the rod. At the base of the conical section 58 there is a flat cylindrical section 59 about one eight inch long and the same diameter as the base of the cone shaped portion. This construction provides a relief of frictional drag after each plate 46 has been fully pierced and thus helps maintain a uniform decelerating force.

In operation, referring to FIGURES 1 and 2, it may be seen that in the event of breakage of anchor rod 33 or elements associated therewith the cylinder 22 is constrained to move in a straight line parallel to the piston rod 21 by the tracks 28 and the platform 25. Normally, the cylinder 22 is restrained from moving along the tracks 28 by means of the anchor rod 33 and anchor block 34. Should either anchor rod 33 or anchor block 34 fail the cylinder 22 would be free to move on tracks 28 and since the magnet 11 is heavier than cylinder 22 the cylinder would move with most of the force of the piston stroke. In such an event however, the piercing rod assembly 41 moves to meet the crash pad 43 and the rod points 58 start to penetrate the plates 46 by entering the holes 52. It will be noted that with this small hole 52 as an entrance for the point 58 the ductile material of plate 46 will peel back uniformly around the point. Without the small holes 52 the plate 46 would be distorted first before the point 58 made the first penetration. This would cause a sudden peak retarding force which then would drop off rapidly and level out for the balance of the penetration of a single plate 46. The holes 52 however provide for a more gradual and uniform retarding force. With plates 46 spaced apart a distance substantially less than the length of rod points 58, the penetration of several plates is taking place simultaneously so that the decelerating force builds up fairly quickly to a maximum and then remains fairly constant for the remainder of the deceleration function.

To further level out the decelerating force developed by the piercing of plates 46 by the points 58, rods 54 may be made of slightly differing lengths so that the points start to pierce the plates at slightly different times. To approximate uniform deceleration, the rods 54 may differ in length by an amount equal to the spacing of plates 46 divided by the number of rods. Thus with four rods 54, as in this embodiment, the length of the rods might increase from one to the next by one-fourth of the spacing between plates 46 center to center. Thus after the penetration of the first plate 46 starts, an additional penetration starts each time the piercing assembly 41 moves forward one-fourth of the distance between plates.

To provide means in the event of a breakdown for automatically cutting off the hydraulic power which drives the cylinder 22, a microswitch 61 is mounted on the base 29 in such position that the control wheel 62 contacts a pointer arm 63 attached to support plate 53 when the cylinder 22 is in the normal position. Microswitch 61 is connected by leads 64 to deactivate the hydraulic supply and control system 24 of the cylinder 22.

Upon movement of cylinder 22 in either direction from its normal position the pointer arm 63 moves off the control wheel 62 of microswitch 61 thereby disconnecting the source of driving energy.

This apparatus as described requires no maintenance under normal conditions and the device can be used in a vacuum where this is desired.

Although in the embodiment of this invention described herein the holes 49 and rods 54 are in a straight line for convenience in mounting, the holes may be placed in any other convenient configuration, such as a square or a rectangle for example, provided such arrangement can be mounted more effectively on the device to be protected. The mounting arms 44 also may be readily changed to meet the requirement of a particular application as long as the members are sufficiently strong.

Should the device requiring protection be unrestricted by means such as tracks 28 shown in FIGURE 1, a modification 38' of the absorber assembly, as illustrated in FIGURE 3, may be used. The apparatus of FIGURE 3 is similar to that of FIGURE 1 except as will be herein described. In this embodiment the two spike support plates 53' of piercing rod assemblies 41' are fastened together by four parallel rods 66 which are secured to the two plates 53' near the corners thereof thus holding the two piercing rod assemblies 41' in fixed spaced apart position with piercing rods 54' of each set aligned. Crash pad 43' is provided with a bore 67 near each corner which passes through all plates 46', all spacer blocks 47' and both end plates 48'. The rods 66 extend through the bores 67 in a sliding relationship therein so that the associated cylinder or other load is constrained to move in the direction of piercing rods 54' without providing tracks or other mechanism for the purpose. It will be noted that the momentum to be controlled in the event of accident is also in a direction parallel to the rods 66 and piercing rods. 54'. The piercing rods 54' thus are so guided that the points 58' thereof will enter the holds 49' in the crash pad 43' to perform the function of piercing plates 46' as heretofore described. In this embodiment an additional mounting means for the crash pad 43' is provided by extending two of the spacer blocks 47' beyond the others on one edge of the pad and thus forming mounting tabs 68 which are secured to stationary anchored brackets 44' by means of bolts 69.

The invention has been herein described with reference to an embodiment wherein the pointed spikes or piercing rods are mounted on the object to be stopped while the energy absorbing plate structure is stationary, this being generally the more convenient arrangement. It should be noted however that the arrangement may be reversed if desired, the plate assembly being secured to the moving object and the spikes being anchored in the path thereof.

Thus although the invention has been disclosed with respect to a preferred embodiment and a single modification thereof it will be evident to those skilled in the art that many variations are possible within the spirit and scope of the invention. Therefore it is not intended to limit the invention except as defined by the following claims.

What is claimed is:

1. Apparatus for stopping unwanted motion of a heavy object relative to a stationary surface comprising, in combination, a first component device having a plurality of parallel pointed rods extending along the direction of said unwanted motion, said pointed rods being of different length, and a second component device having at least one plate formed of a material penetrable by said rods and disposed transversely with respect to said rods whereby said rods penetrate said plate at differing times in the course of said unwanted motion, one of said component devices being secured to said heavy object and the other of said devices being secured to said stationary surface.

2. Apparatus for stopping unwanted motion of a heavy object comprising, in combination, a stationary pad assembly secured at a position adjacent said object and having a plurality of spaced apart parallel plates disposed transversely with respect to the direction of said unwanted motion of said object, said plurality of plates being transpierced by a plurality of sets of aligned apertures, and a plurality of parallel rigid pointed spikes secured to said heavy object and projecting therefrom towards said stationary pad in the direction of said unwanted motion, each of said spikes being directed at a separate one of said sets of aligned apertures in said plates and having a diameter greater than that of said apertures whereby said object will be stopped by penetration of successive ones of said plates by said spikes.

3. Apparatus for stopping unwanted motion of a heavy object as described in claim 2 wherein said apparatus is further characterized by the points on said spikes having the configuration of right angled cones the base diameters of which are larger than the diameter of the adjacent portions of said spikes whereby each plate retards each spike only while the point of the spike is penetrating the plate thereby maintaining a more constant decelerating force on said object.

4. Apparatus for stopping unwanted motion of a heavy object as described in claim 2 wherein said apparatus is further characterized by a second plurality of parallel rigid spikes secured to said object in alignment with said first plurality of spikes and projecting from said object in the opposite direction from said first plurality of spikes and toward the opposite side of said pad to stop unwanted motion in the opposite direction from that to be stopped by said first plurality of spikes.

5. Apparatus for stopping unwanted motion of a heavy object as described in claim 2 wherein said pad assembly of said apparatus is characterized by having a flat spacer element between each adjacent pair of said parallel plates, said spacer elements being transpierced by a plurality of bores which are coaxial with said plurality of apertures in said plates, said bores having a larger diameter than the diameter of said spikes whereby said spacer elements provide support for said plates but permit peel back of the material of said plates around the points of said spikes within said bores.

6. Apparatus for stopping unwanted motion of a heavy object as described in claim 2 and comprising the further combination of guide means coupled between said heavy object and said crash pad assembly for constraining said spikes to move precisely in the direction of apertures in said plates.

7. Apparatus for stopping unwanted motion of a heavy object as described in claim 2 wherein said pad assembly is provided with a bore extending the direction of said unwanted motion and comprising the further combination of a rod slidingly disposed within said bore and secured to said heavy object whereby said object is constrained to move in the precise direction at which said spikes will enter said apertures in said plates.

References Cited by the Examiner

UNITED STATES PATENTS 2,776,695 1/57 Wells _____ 188—1 X
2,811,385 10/57 Butler.

FOREIGN PATENTS 1,105,404 6/55 France.

ARTHUR L. LA POINT, *Primary Examiner.*

DUANE A. REGER, EUGENE G. BOTZ, *Examiners.*